(12) United States Patent
Chen et al.

(10) Patent No.: US 9,552,043 B2
(45) Date of Patent: Jan. 24, 2017

(54) HANDHELD ELECTRONIC DEVICE AND OPERATION METHOD OF THE SAME

(71) Applicant: HTC Corporation, Taoyuan County (TW)

(72) Inventors: Wen-Chun Chen, Taoyuan County (TW); Hsin-Ti Chueh, Taoyuan County (TW); Abhishek Saxena, Taoyuan County (TW); Chia-Wei Chen, Taoyuan County (TW); Hung-Wen Chien, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/474,319

(22) Filed: Sep. 2, 2014

(65) Prior Publication Data

US 2015/0062044 A1 Mar. 5, 2015

Related U.S. Application Data

(60) Provisional application No. 61/872,842, filed on Sep. 2, 2013.

(51) Int. Cl.

| | |
|---|---|
| *G06F 3/038* | (2013.01) |
| *G06F 1/32* | (2006.01) |
| *G06F 3/01* | (2006.01) |
| *G06F 3/041* | (2006.01) |
| *G06F 3/0488* | (2013.01) |
| *G06F 3/0346* | (2013.01) |

(52) U.S. Cl.
CPC ........... *G06F 1/3228* (2013.01); *G06F 1/3265* (2013.01); *G06F 3/017* (2013.01); *G06F 3/0346* (2013.01); *G06F 3/0412* (2013.01); *G06F 3/0416* (2013.01); *G06F 3/0488* (2013.01); *Y02B 60/1242* (2013.01)

(58) Field of Classification Search
CPC ...... G06F 1/3228; G06F 1/324; G06F 1/3265; G06F 3/017; G06F 3/0412; G06F 3/0416; G06F 3/0346; G06F 3/0488; Y02B 60/1242
USPC .......................................... 345/173–179, 211
See application file for complete search history.

(56) References Cited

U.S. PATENT DOCUMENTS

| | | | | |
|---|---|---|---|---|
| 2010/0235664 A1* | 9/2010 | Karlsson | ............... | G06F 1/3228 713/323 |
| 2014/0101472 A1* | 4/2014 | Rohrweck | ............. | G06F 1/3265 713/323 |
| 2014/0184502 A1* | 7/2014 | Liu | ....................... | G06F 3/0346 345/158 |

\* cited by examiner

*Primary Examiner* — Nelson Rosario

(74) *Attorney, Agent, or Firm* — CKC & Partners Co., Ltd.

(57) ABSTRACT

A handheld electronic device is provided. The handheld electronic device includes a touch display unit, a sensor unit and a processing unit. The sensor unit detects a rotation angle of the handheld electronic device relative to a gravity direction and a displacement of the handheld electronic device. The processing unit is electrically connected to the touch display unit and the sensor unit to extend a timeout threshold of the touch display unit from a first value to a second value that is larger than the first value when the rotation angle is within a reading mode range. The processing unit keeps the timeout threshold at the second value when at least a first condition that the displacement of the handheld electronic device is larger than a predetermined value is met.

10 Claims, 2 Drawing Sheets

HANDHELD ELECTRONIC DEVICE AND OPERATION METHOD OF THE SAME

RELATED APPLICATIONS

This application claims the priority benefit of U.S. Provisional Application Ser. No. 61/872,842, filed Sep. 2, 2013, which is herein incorporated by reference.

BACKGROUND

Field of Invention

The present disclosure relates to an electronic device technology. More particularly, the present disclosure relates to a handheld electronic device and an operation method of the same.

Description of Related Art

Handheld electronic devices are essential communication tools for people in the daily life for most people. Besides the ability of communication, the handheld electronic devices are equipped with increasing abilities of data operation and data processing. The combination of the data operation ability and the communication ability makes the handheld electronic devices such as the tablet PCs or the smartphones reminiscent to small computers. It is convenient to edit documents, navigate the network, receive e-mails and deliver e-mails by using the handheld electronic devices.

Screen timeout is a mechanism to save battery life. It's also a way to turn off screen automatically if user forgets to turn the screen off. Most of the time, it helps people to turn off the screen when user is not using the device. However, if user takes longer time to read documents or watch movies such that the time that the device idles exceeds the timeout threshold, the screen will be turned off even if the user is still reading documents or watching movies. The design of the screen timeout becomes inconvenient in such a usage scenario.

Accordingly, what is needed is a handheld electronic device and an operation method of the same to address the above issue.

SUMMARY

An aspect of the present invention is to provide a handheld electronic device. The handheld electronic device includes a touch display unit, a sensor unit and a processing unit. The sensor unit detects a rotation angle of the handheld electronic device and a displacement of the handheld electronic device. The processing unit is electrically connected to the touch display unit and the sensor unit to extend a timeout threshold of the touch display unit from a first value to a second value that is larger than the first value when the rotation angle is within a reading mode range. The processing unit keeps the timeout threshold at the second value when a criteria comprising a first condition that the displacement of the handheld electronic device is larger than the predetermined value is met.

Another aspect of the present invention is to provide an operation method used in a handheld electronic device, wherein the handheld electronic device includes a touch display unit, a sensor unit and a processing unit. The operation method includes the steps outlined below. A rotation angle of the handheld electronic device is detected by the sensor unit. Whether the rotation angle is within a reading mode range is determined by the processing unit. A timeout threshold of the touch display unit is extended from a first value to a second value that is larger than the first value by the processing unit when the rotation angle is within the reading mode range. A displacement of the handheld electronic device is detected by the sensor unit. Whether the displacement of the handheld electronic device is larger than a predetermined value is determined by the processing unit. The timeout threshold is kept at the second value by the processing unit when a criteria comprising a first condition that the displacement of the handheld electronic device is larger than the predetermined value is met.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
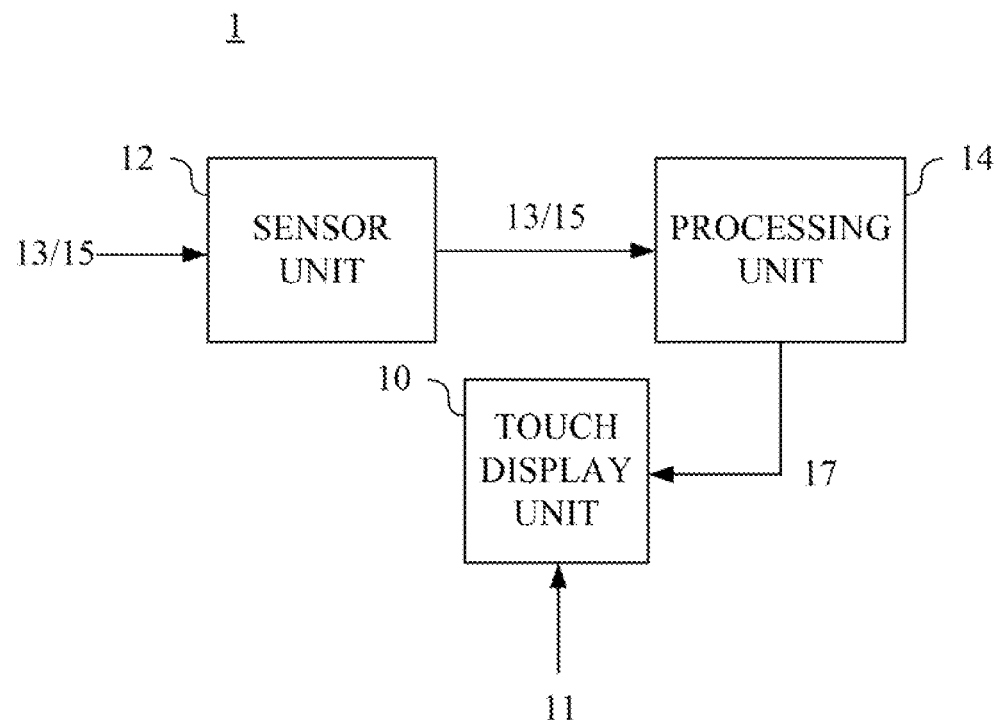
FIG. 1 is a block diagram of a handheld electronic device in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
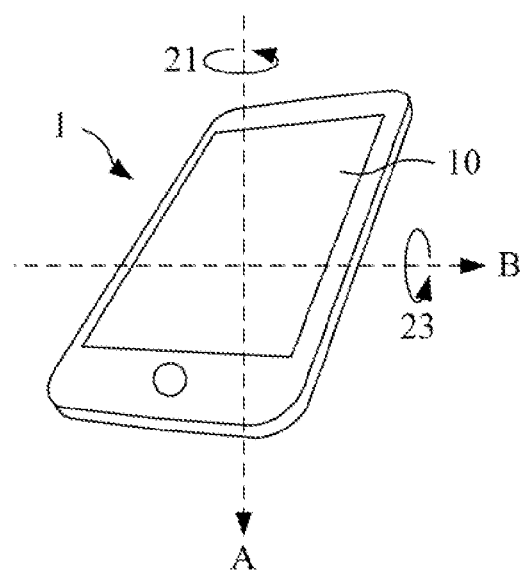
FIG. 2 is a 3-D diagram of the handheld electronic device in FIG. 1 in an embodiment of the present invention.

FIG. 1 is a block diagram of a handheld electronic device 1 in an embodiment of the present invention. FIG. 2 is a 3-D diagram of the handheld electronic device 1 in FIG. 1 in an embodiment of the present invention. The handheld electronic device 1 includes a touch display unit 10, a sensor unit 12 and a processing unit 14.

The touch display unit 10 displays frames based on different operation conditions of the handheld electronic device 1. In an embodiment, the touch display unit 10 displays the frames according to the display data transmitted by the processing unit 14. Moreover, the touch display unit 10 is able to receive a touch input 11 performed thereon.

In an embodiment, the sensor unit 12 is a motion sensor such as, but not limited to a G-sensor. The sensor unit 12 detects a rotation angle 13 of the handheld electronic device 1 and a displacement 15 of the handheld electronic device 1.

In an embodiment, the rotation angle 13 is relative to a gravity direction A and a horizontal direction B that is perpendicular to the gravity direction A. The rotation angle 13 may include at least one of a roll motion angle 21 relative to the gravity direction A and a pitch motion angle 23 relative to the horizontal direction B.

The processing unit 14 is electrically connected to the touch display unit 10 and the sensor unit 12. The processor unit 14 determines that whether the rotation angle 13 detected by the sensor unit 12 is within a reading mode range. In an embodiment, the reading mode range can be selected to meet the typical range of angles that the users would hold the handheld electronic device 1 when they are reading or watching the content displayed by the touch display unit 10. For example, the processing unit 14 can determine that the rotation angle 13 is within the reading mode range when the pitch motion angle 23 is larger than 30 degrees relative to the horizontal direction B.

When the processing unit 14 determines that the rotation angle 13 is not within the reading mode range, the processing unit 14 keeps a timeout threshold 17 of the touch display unit 10 at a first value, in which the timeout threshold is largest time period to prevent the touch display unit 10 from entering a sleep mode when there is no touch input 11 performed thereon.

The processing unit 14 extends the timeout threshold 17 of the touch display unit 10 from the first value to a second value that is larger than the first value when the rotation angle 13 is within the reading mode range. For example, the processing unit 14 may extend the timeout threshold 17 of the touch display unit 10 from less than one minute to one minute once the rotation angle 13 is within the reading mode range.

In an embodiment, the timeout threshold 17 is the largest time threshold that the touch display unit 10 is allowed to stay in an idle status. When the touch display unit 10 is still in the idle status when the timeout threshold 17 is exceeded, the processing unit 14 operates the touch display unit 10 in a sleep mode. The idle state means that no touch is sensed by the touch display.

After the timeout threshold 17 is extended, the processing unit 14 further determines that whether the displacement 15 of the handheld electronic device 1 is larger than a predetermined value. When the displacement 15 of the handheld electronic device 1 is larger than the predetermined value, it is determined that the handheld electronic device 1 is not in a still condition and is in use. The processing unit 14 keeps the timeout threshold 17 at the second value when a criteria is met, in which the criteria includes the condition that the displacement 15 of the handheld electronic device 1 is larger than the predetermined value.

On the contrary, when the displacement 15 of the handheld electronic device 1 is not larger than the predetermined value it is determined that the handheld electronic device 1 is in a still condition and is not in use. The processing unit 14 restores the timeout threshold 17 from the second value to the first value.

As a result, the handheld electronic device 1 in the present invention is able to extend the timeout threshold 17 of the touch display unit 10 once the rotation angle 13 detected by the sensor unit 12 is determined to be in the reading mode range. The timeout threshold 17 can be further kept at the extended value (i.e. the second value) when the displacement 15 detected by the sensor unit 12 is determined to be larger than the predetermined value such that the users would not be bothered by the short timeout threshold 17 of the touch display unit 10 when they are reading or watching the content displayed thereon, in which the short timeout threshold 17 may force the touch display unit 10 enters the sleep mode much earlier.

In another embodiment, after the timeout threshold 17 is extended, the processing unit 14 further determines that whether the touch display unit 10 detects the touch input 11 performed thereon within a predetermined time period. For example, the processing unit 14 determines that whether the touch display unit 10 detects the touch input 11 performed thereon within three minutes. The processing unit 14 keeps the timeout threshold 17 at the second value when a criteria is met, in which the criteria includes the first condition that the displacement 15 of the handheld electronic device 1 is larger than the predetermined value and the second condition that the touch display unit 10 detects the touch input 11 performed thereon within the predetermined time period.

On the contrary, when the displacement 15 of the handheld electronic device 1 is larger than the predetermined value and when the touch display unit 10 does not detect the touch input 11 performed thereon within the predetermined time period, the processing unit 14 restores the timeout threshold 17 from the second value to the first value.

In some usage scenarios, the users may stay in a moving vehicle and put the handheld electronic device 1 in a position having the rotation angle within the reading mode range. Though the handheld electronic device 1 is actually not in use, the processing unit 14 may still falsely determine that the handheld electronic device 1 is in use when only the condition that the displacement 15 is larger than the predetermined value is met and keep the timeout threshold 17 extended. As a result, by detecting the displacement 15 of the handheld electronic device 1 and the touch input 11 performed on the touch display unit 10, the processing unit 14 can avoid the scenarios mentioned above and keep extending the timeout threshold 17 only when the handheld electronic device 1 is actually in use.

It is noted that in the embodiment mentioned above, the processing unit 14 determines that the criteria is met to further determine that the handheld electronic device 1 is in use, in which the criteria includes a first condition that the displacement 15 of the handheld electronic device 1 is larger than the predetermined value and a second condition that the touch display unit 10 receives the touch input 11 performed thereon within the predetermined time period. In other embodiments, the criteria may include other conditions for the processing unit 14 to determine that the handheld electronic device 1 is in use.

Figure 3:
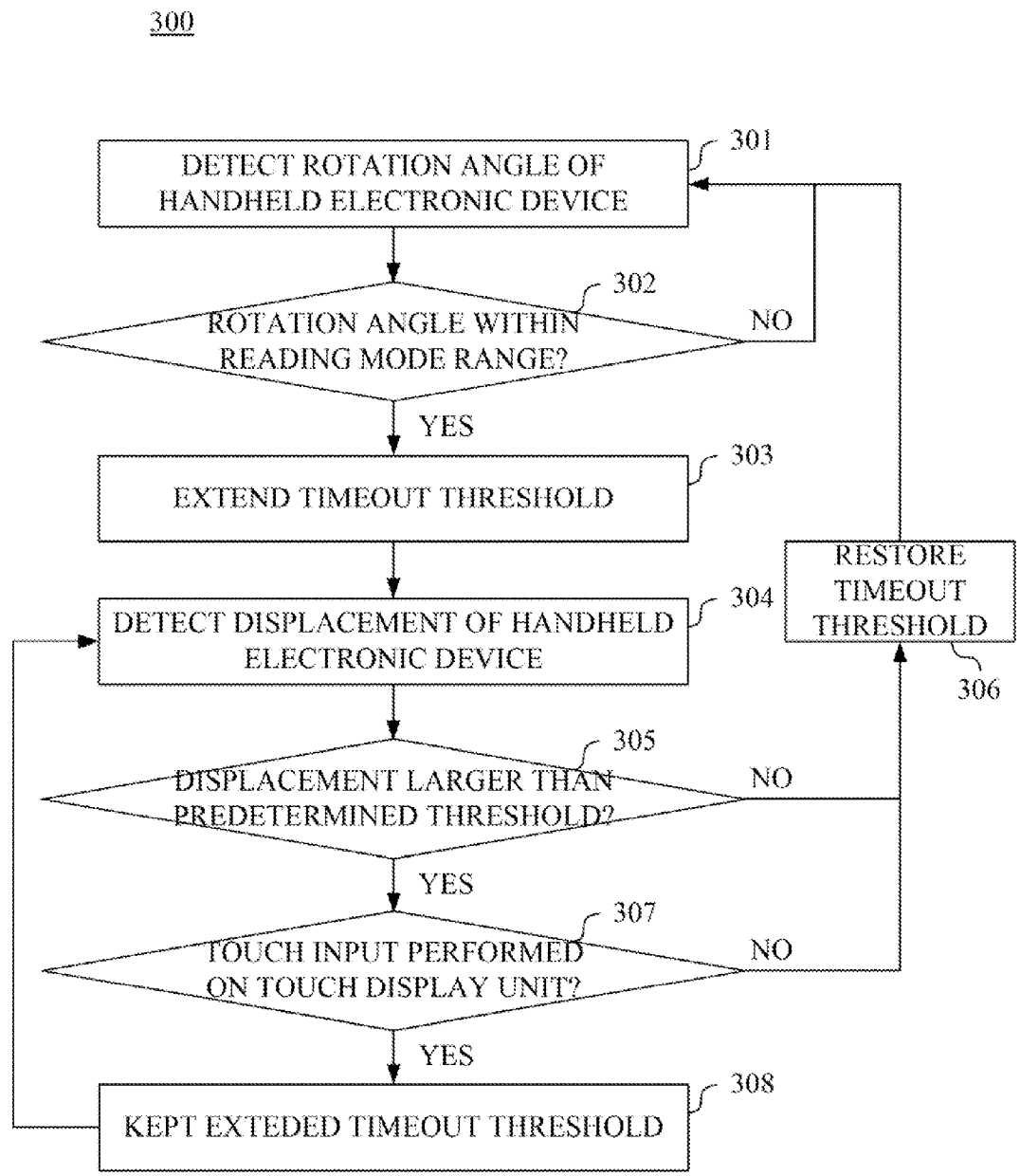
FIG. 3 is a flow chart of an operation method of the handheld electronic device in an embodiment of the present invention.

FIG. 3 is a flow chart of an operation method 300 of the handheld electronic device 1 in an embodiment of the present invention. The operation method 300 can be used in the handheld electronic device 1 illustrated in FIG. 1 and FIG. 2. The operation method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, a rotation angle 13 of the handheld electronic device 1 is detected by the sensor unit 12.

In step 302, whether the rotation angle 13 is within the reading mode range is determined by the processing unit 14.

When the rotation angle 13 is not within the reading mode range, the flow goes back to step 301 to keep detecting the rotation angle 13.

When the rotation angle 13 is within the reading mode range, the timeout threshold 17 of the touch display unit 10 is extended from the first value to the second value that is larger than the first value by the processing unit 14 in step 303.

Further, in step 304, a displacement 15 of the handheld electronic device 1 is detected by the sensor unit 12.

In step 305, whether the displacement 15 of the handheld electronic device 1 is larger than the predetermined value is determined by the processing unit 14.

When the displacement 15 of the handheld electronic device 1 is not larger than the predetermined value, the timeout threshold 17 is restored from the second value to the first value by the processing unit 14 in step 306. The flow further goes back to step 301 to keep detecting the rotation angle 13.

When the displacement 15 of the handheld electronic device 1 is larger than the predetermined value, whether the touch input 11 is performed on the touch display unit 10 within the predetermined time period is further determined by the processing unit 14 in step 307.

When the touch input 11 is not performed on the touch display unit 10 within the predetermined time period, the timeout threshold 17 is restored from the second value to the first value by the processing unit 14 in step 306. The flow further goes back to step 301 to keep detecting the rotation angle 13.

When the touch input 11 is performed on the touch display unit 10 within the predetermined time period, the processing unit 14 determines that a criteria including a first condition that the displacement 15 of the handheld electronic device 1 is larger than the predetermined value and a second condition that the touch display unit 10 receives the touch input 11 performed thereon within the predetermined time period is met. Subsequently, the timeout threshold 17 is kept at the extended second value by the processing unit 14 in step 308. The flow goes back to step 304 to keep detecting the displacement 15 of the handheld electronic device 1.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A handheld electronic device, comprising:
a touch display unit to receive touch input;
a sensor unit to detect a rotation angle of the handheld electronic device and a displacement of the handheld electronic device; and
a processing unit electrically connected to the touch display unit and the senor unit to extend a timeout threshold of the touch display unit from a first value to a second value that is larger than the first value based on the rotation angle that is within a reading mode range;
wherein while the rotation angle is within the reading mode range,
the processing unit keeps the timeout threshold at the second value based on the displacement of the handheld electronic device that is larger than the predetermined value and the condition that the touch display unit receives the touch input performed thereon within a predetermined time period;
the processing unit restores the timeout threshold from the second value to the first value based on the condition that the touch display unit does not receive any touch input within the predetermined time period; and
after the processing unit restores the timeout threshold from the second value to the first value, the processing unit operates the touch display unit in a sleep mode based on the condition that the processing unit determines that a time that the touch display unit does not receive the touch input exceeds the first value.

2. The handheld electronic device of claim 1, wherein the processing unit keeps the timeout threshold at the first value when the rotation angle is not within the reading mode range.

3. The handheld electronic device of claim 1, wherein the processing unit restores the timeout threshold from the second value to the first value when the displacement of the handheld electronic device is not larger than a predetermined value.

4. The handheld electronic device of claim 1, the sensor unit comprises a motion sensor.

5. The handheld electronic device of claim 1, wherein the rotation angle is relative to a gravity direction and a horizontal direction that is perpendicular to the gravity direction.

6. The handheld electronic device of claim 1, wherein the rotation angle comprises at least one of a roll motion angle and a pitch motion angle.

7. An operation method used in a handheld electronic device, wherein the handheld electronic device comprises a touch display unit, a sensor unit and a processing unit electrically connected to the touch display unit and the sensor unit, the operation method comprises:
detecting a rotation angle of the handheld electronic device by the sensor unit;
determining that whether the rotation angle is within a reading mode range by the processing unit and determining whether the touch display unit receives a touch input;
extending a timeout threshold of the touch display unit from a first value to a second value that is larger than the first value by the processing unit when the rotation angle is within the reading mode range;
wherein while the rotation anile that is within the reading mode range,
detecting a displacement of the handheld electronic device by the sensor unit and determining that whether the displacement of the handheld electronic device is larger than a predetermined value by the processing unit; and
keeping the timeout threshold at the second value by the processing unit based on the displacement of the handheld electronic device that is larger than the predetermined value and the condition that the touch display unit receives the touch input performed thereon within a predetermined time period;
restoring the timeout threshold from the second value to the first value based on the condition that the touch display unit does not receive any touch input within the predetermined time period; and
after the timeout threshold is restored from the second value to the first value, operating the touch display unit in a sleep mode based on the condition that a time that the touch display unit does not receive the touch input is determined to exceed the first value.

8. The operation method of claim 7, further comprising:
keeping the timeout threshold at the first value by the processing unit when the rotation angle is not within the reading mode range.

9. The operation method of claim 7, further comprising:
restoring the timeout threshold from the second value to the first value by the processing unit when the displacement of the handheld electronic device is not larger than a predetermined value.

10. The operation method of claim 7, wherein the rotation angle comprises at least one of a roll motion angle and a pitch motion angle.

* * * * *